July 18, 1933. S. F. WILLIAMS 1,918,306
ROD COUPLING
Filed Jan. 28, 1931
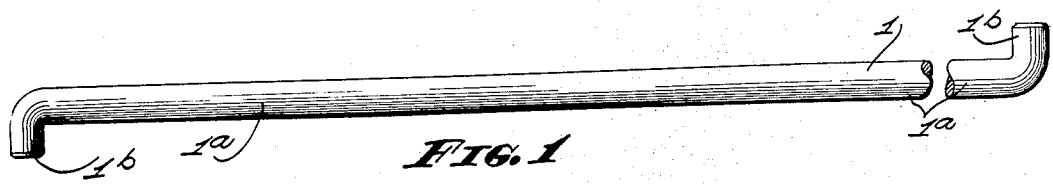
FIG.1
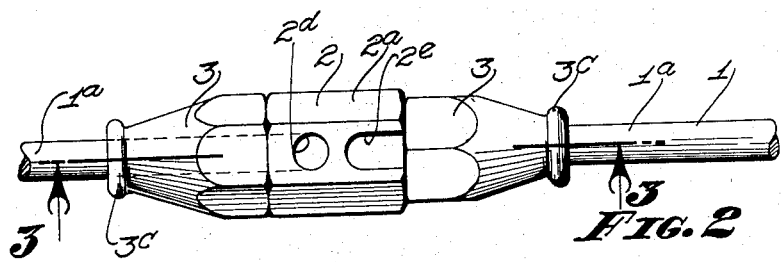
FIG.2
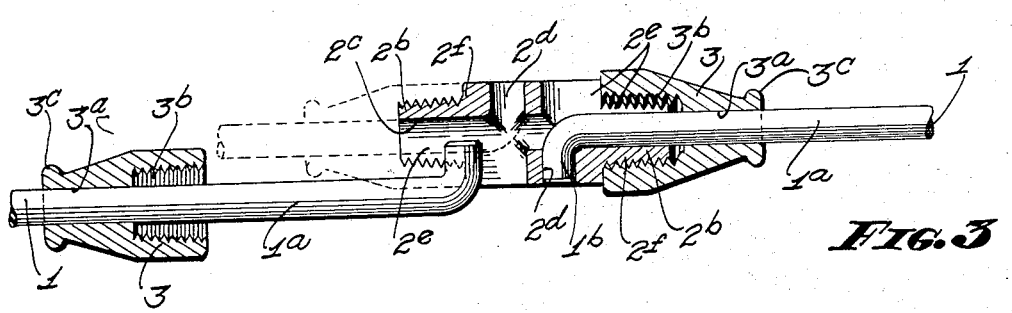
FIG.3
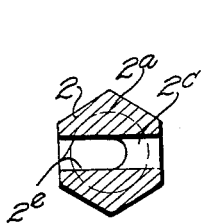
FIG.6
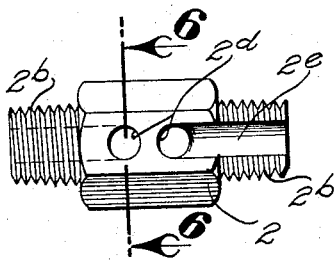
FIG.4
FIG.5
INVENTOR
SAMUEL F. WILLIAMS
BY A. B. Bowman
ATTORNEY Patented July 18, 1933

1,918,306

UNITED STATES PATENT OFFICE

SAMUEL F. WILLIAMS, OF SAN DIEGO, CALIFORNIA

ROD COUPLING

Application filed January 28, 1931. Serial No. 511,750.

My invention relates to rod couplings and the objects of my invention are:

First, to provide a rod coupling in which the means which function to hold the several members of the coupling together are entirely free from any longitudinally applied compression or tension strains as well as torsional strain, thus providing a rod coupling which readily withstands these strains without separating.

Second, to provide a rod coupling which may be readily connected or separated when desired.

Third, to provide a rod coupling in which the rods may be connected while in proximate alinement or in parallel disposed relation, there being no need of arranging the rods in angular relation to each other in order to effect a coupling.

Fourth, to provide a coupling of this class which is particularly adapted for connecting several sections of rods to form a chain of rods having considerable length, and Fifth, to provide on the whole a novelly constructed rod coupling which is particularly simple of construction proportional to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a fragmentary elevation view of the rod used in conjunction with my rod coupling; Fig. 2 is an assembled elevational view of my rod coupling with the rods shown fragmentarily; Fig. 3 is a sectional view through 3—3 of Fig. 2, with one of the rods shown in offset relation for illustrating the manner in which the rods are joined; Fig. 4 is an elevational view of the connecting member; Fig. 5 is an end elevational view thereof; and Fig. 6 is a transverse sectional view thereof through 6—6 of Fig. 4.

Similar characters of reference refer to similar parts and portions throughout the several views of the drawing.

Rod member 1, connecting member 2, securing nuts 3, constitute the principal parts and portions of my novel rod coupling.

The rod members 1 are preferably round although they may be polygonal if desired, and an elongated straight shank portion $1a$ at the ends of which are offset portions $1b$ which form interlocking means. These offset portions are formed by bending the material at right angles as shown best in Fig. 1.

A connecting member 2 is provided which includes an enlarged central portion $2a$ of polygonal cross section. Extending from opposite ends of the central portion $2a$ are threaded nipple portions $2b$ which are externally threaded and are slightly tapered. The connecting member 2 is provided with a bore $2c$ therethrough having the same diameter as the rod 1. The central portion $2a$ is provided with a pair of diametrically disposed offset lateral openings $2d$ which intersect the bore $2c$. These openings are adapted to receive the offset portions $1b$ of the rod members 1 while the bore $2c$ receives the adjacent portion of their shanks $1a$. The connecting member 2 is provided with a pair of slots $1e$ which are cut into the nipples $2b$ so as to intersect the bore $2c$, and extend into the central portion $2a$ until opposite their respective lateral openings $2d$ as shown best in Fig. 3.

The slots $2e$ enable the end portion of the rod members 1 to be moved axially into the connecting members 2, while in a slight offset relation thereto as shown in Fig. 3. When the offset portion $1a$ of the rod member 1 is opposite the corresponding opening $2d$, it is moved radially into the opening and occupies the position shown by dotted lines at the left hand side of Fig. 3, and also shown by solid lines at the right hand side of Fig. 3.

Each lateral opening $2d$, corresponding slot $2e$ and corresponding portion of the bore $2c$ leave a web $2f$ which is fully capable of standing any of the tensional strain applied to the rod.

Each of the rod members 1 is held in place by a securing nut 3. Each nut 3 is slidably mounted on the rod member as shown best in Fig. 3, said securing nuts being provided with a sleeve portion 3a arranged in centered relation to an internally threaded portion 3b adapted to screw upon the nipples 2b. The securing nuts are largest around the internally threaded portion 3b and are preferably polygonal in cross section at this portion. The large end of each securing nut tapers to its other extremity where it is provided with a reinforcing ridge 3c as shown in Figs. 2 and 3.

After the rod members have been positioned with respect to the connecting member 2, the securing nuts are screwed onto the nipple 2b so that the couplings when joined together appear as shown in Fig. 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A rod coupling consisting of a rod provided with laterally extending portions in opposite directions at its opposite ends, a single piece connector member provided with a channel extending from the center laterally to the outside therein from each end thereof, and a lateral opening from the opposite side of said connector member intersecting each of said channels inwardly from each end of said connector member, each of said channels and openings arranged to receive one end of said rod and lateral extending portion, said connector member being threaded at its opposite ends, and nuts adapted to fit over the main portion of said rod and screw on said threaded portions of said connector member for holding said rods in axial alinement with said connector member.

2. In a rod coupling, a connecting member consisting of a single piece provided with reduced screw threaded portions at its opposite ends, a slot adapted to receive a rod extending from the center outwardly and extending to near the middle portion longitudinally of said connecting member, and a hole extending from the center outwardly from the other side of the middle longitudinally in alinement therewith, and a similar slot and hole in the opposite side of said connecting member in reverse relation thereto.

3. In a rod coupling, a connecting member consisting of a single piece provided with reduced screw threaded portions at its opposite ends, a slot adapted to receive a rod extending from the center outwardly and extending to near the middle portion longitudinally of said connecting member, a hole extending from the center outwardly from the other side of the middle longitudinally in alinement therewith, a similar slot and hole in the opposite side of said connecting member in reverse relation thereto, a single piece metallic rod with a laterally extending end portion adapted to fit into said slot and its laterally extending end extend into the hole on the opposite side of said connecting member from said slot, and a nut shiftably mounted on the body portion of said rod and adapted to screw on the reduced portion of said connecting member and holding said rod in axial alinement with the longitudinal axis of said connecting member.

SAMUEL F. WILLIAMS.